US008827738B2

(12) United States Patent
Lownds et al.

(10) Patent No.: US 8,827,738 B2
(45) Date of Patent: Sep. 9, 2014

(54) CONNECTOR, AND METHODS OF USE

(75) Inventors: Charles Michael Lownds, Salt Lake City, UT (US); James Blair Hamblen, Corryton, TN (US)

(73) Assignee: Orica Explosives Technology Pty Ltd, Melbourne, Victoria (AU)

( * ) Notice: Subject to any disclaimer, the term of this patent is extended or adjusted under 35 U.S.C. 154(b) by 145 days.

(21) Appl. No.: 13/505,464

(22) PCT Filed: Oct. 29, 2010

(86) PCT No.: PCT/AU2010/001448
§ 371 (c)(1),
(2), (4) Date: Jul. 26, 2012

(87) PCT Pub. No.: WO2011/054031
PCT Pub. Date: May 12, 2011

(65) Prior Publication Data
US 2012/0282785 A1    Nov. 8, 2012

Related U.S. Application Data

(60) Provisional application No. 61/257,572, filed on Nov. 3, 2009.

(51) Int. Cl.
*H01R 4/24* (2006.01)
(52) U.S. Cl.
CPC ............ *H01R 4/2433* (2013.01); *H01R 4/2429* (2013.01); *H01R 4/2454* (2013.01); *H01R 4/2425* (2013.01); *H01R 4/2445* (2013.01)
USPC ....................................................... 439/402

(58) Field of Classification Search
CPC .. H01R 4/2433; H01R 4/2429; H01R 4/2454; H01R 4/2425; H01R 4/2445
USPC ......... 439/402, 403, 409, 410, 502, 505, 596, 439/658, 419
See application file for complete search history.

(56) References Cited

U.S. PATENT DOCUMENTS

| | | | |
|---|---|---|---|
| 2,715,365 A | * | 8/1955 | Godchaux, II et al. ....... 102/204 |
| 3,715,450 A | | 2/1973 | Martin |
| 3,836,944 A | | 9/1974 | Lawson |

(Continued)

FOREIGN PATENT DOCUMENTS

| | | |
|---|---|---|
| CN | 1047920 A | 12/1990 |
| DE | 196 22 655 A1 | 12/1997 |

(Continued)

OTHER PUBLICATIONS

International Search Report issued in PCT/AU2010/001448, dated Feb. 10, 2011.

(Continued)

*Primary Examiner* — Amy Cohen Johnson
*Assistant Examiner* — Vladimir Imas
(74) *Attorney, Agent, or Firm* — Birch, Stewart, Kolasch & Birch, LLP

(57) ABSTRACT

Disclosed herein are connectors for connecting a variety of wires at a blast site, for versatile set-up of lines extending for example between a blasting machine and detonators, or between different detonators. Also disclosed are methods for providing electrical connection between various components of a blasting apparatus at a blast site.

33 Claims, 10 Drawing Sheets

(56) References Cited

U.S. PATENT DOCUMENTS

| | | | |
|---|---|---|---|
| 4,085,676 A * | 4/1978 | Calder et al. | 102/332 |
| 4,347,789 A * | 9/1982 | Ricketts | 102/275.3 |
| 4,461,528 A * | 7/1984 | Durand et al. | 439/409 |
| 4,684,195 A * | 8/1987 | Anderson et al. | 439/404 |
| 4,915,646 A | 4/1990 | Bock et al. | |
| 4,932,894 A | 6/1990 | Scherer | |
| 4,934,270 A | 6/1990 | Wilkins et al. | |
| 4,938,719 A | 7/1990 | Sawai et al. | |
| 4,941,844 A | 7/1990 | Bowden et al. | |
| 4,946,407 A | 8/1990 | Young | |
| 4,952,167 A | 8/1990 | Hertelendy | |
| 4,998,478 A | 3/1991 | Beck | |
| 5,009,612 A * | 4/1991 | Rishworth et al. | 439/403 |
| 5,011,433 A | 4/1991 | Pfeiffer et al. | |
| 5,064,382 A | 11/1991 | Minnis | |
| 5,067,910 A | 11/1991 | Knox et al. | |
| 5,098,313 A | 3/1992 | Marsh et al. | |
| 5,171,935 A | 12/1992 | Michna et al. | |
| 5,199,899 A * | 4/1993 | Ittah | 439/403 |
| 5,205,757 A | 4/1993 | Hertelendy | |
| 5,350,308 A | 9/1994 | Laska et al. | |
| 5,370,558 A | 12/1994 | Scherer et al. | |
| 5,375,524 A | 12/1994 | Larson | |
| 5,392,712 A | 2/1995 | Waldock | |
| 5,429,530 A | 7/1995 | Zander et al. | |
| 5,433,625 A | 7/1995 | Tsuji et al. | |
| 5,435,747 A * | 7/1995 | Franckx et al. | 439/409 |
| 5,447,453 A | 9/1995 | Smith et al. | |
| 5,463,955 A | 11/1995 | Carriere | |
| 5,505,631 A | 4/1996 | Schauer et al. | |
| 5,554,053 A | 9/1996 | Matthews | |
| 5,605,470 A | 2/1997 | Braithwaite et al. | |
| 5,639,258 A | 6/1997 | Clark | |
| 5,676,557 A | 10/1997 | Jego et al. | |
| 5,690,505 A * | 11/1997 | Hirata | 439/402 |
| 5,714,717 A | 2/1998 | Nakagome | |
| 5,716,234 A | 2/1998 | Phillips | |
| 5,727,965 A | 3/1998 | Yagi | |
| 5,743,756 A | 4/1998 | Hasz et al. | |
| 5,820,404 A * | 10/1998 | Chishima et al. | 439/417 |
| 5,850,789 A | 12/1998 | Rudolf et al. | |
| 5,961,341 A * | 10/1999 | Knowles et al. | 439/403 |
| 6,039,604 A | 3/2000 | Tindall | |
| 6,113,429 A | 9/2000 | Weigel et al. | |
| 6,129,560 A | 10/2000 | Baur et al. | |
| 6,146,598 A | 11/2000 | Duvacquier et al. | |
| 6,176,713 B1 | 1/2001 | Okabe | |
| 6,299,472 B1 * | 10/2001 | Beukes | 439/403 |
| 6,383,012 B1 | 5/2002 | Kisu et al. | |
| 6,443,755 B1 * | 9/2002 | Beukes et al. | 439/402 |
| 6,443,756 B1 | 9/2002 | Hagmann et al. | |
| 6,457,989 B1 * | 10/2002 | Aoki et al. | 439/402 |
| 6,619,995 B1 | 9/2003 | Hayashi et al. | |
| 6,648,671 B2 * | 11/2003 | Suzuki et al. | 439/404 |
| 6,769,931 B2 * | 8/2004 | Negishi et al. | 439/404 |
| 6,893,284 B1 | 5/2005 | Fawcett et al. | |
| 7,026,559 B2 | 4/2006 | James | |
| 7,179,101 B2 * | 2/2007 | Murakami et al. | 439/142 |
| 7,540,749 B1 * | 6/2009 | Hall et al. | 439/135 |
| 2001/0027043 A1 | 10/2001 | Shiraki et al. | |
| 2003/0199202 A1 | 10/2003 | Ju | |
| 2004/0033714 A1 | 2/2004 | Maini et al. | |
| 2004/0166715 A1 | 8/2004 | Parrish et al. | |
| 2004/0248475 A1 | 12/2004 | Seminara et al. | |
| 2005/0048843 A1 | 3/2005 | Iida | |
| 2005/0064763 A1 | 3/2005 | Shindo | |
| 2005/0079770 A1 | 4/2005 | Shindo | |
| 2005/0260883 A1 | 11/2005 | Aihara et al. | |
| 2007/0037428 A1 | 2/2007 | Annecke | |

FOREIGN PATENT DOCUMENTS

| | | |
|---|---|---|
| DE | 198 38 423 A1 | 3/2000 |
| DE | 200 04 567 U1 | 6/2000 |
| EP | 0 318 007 A2 | 5/1989 |
| EP | 0 382 482 A2 | 8/1990 |
| EP | 0 690 523 A1 | 1/1996 |
| EP | 0 802 581 A2 | 10/1997 |
| EP | 0825678 A2 | 2/1998 |
| EP | 0 877 455 A1 | 11/1998 |
| EP | EP 1 091 455 A2 | 4/2001 |
| EP | EP 1 160 934 A2 | 5/2001 |
| EP | 1564858 A1 | 8/2005 |
| FR | 2 722 780 A1 | 1/1996 |
| GB | 2 268 004 A | 12/1993 |
| GB | 2 316 549 A | 2/1998 |
| GB | 2 378 055 A | 1/2003 |
| GB | 2 415 837 A | 1/2006 |
| JP | 1-173579 A | 7/1989 |
| JP | 2-46671 A | 2/1990 |
| JP | 8-162183 A | 6/1996 |
| JP | 8-213064 A | 8/1996 |
| JP | 8-315873 A | 11/1996 |
| JP | 9-45383 A | 2/1997 |
| JP | 9-45384 A | 2/1997 |
| JP | 9-115557 A | 5/1997 |
| JP | 10-40974 A | 2/1998 |
| JP | 11-250994 A | 9/1999 |
| JP | 11-265742 A | 9/1999 |
| JP | 11-265743 A | 9/1999 |
| JP | 11-285134 A | 10/1999 |
| JP | 11-345634 A | 12/1999 |
| JP | 11-345635 A | 12/1999 |
| JP | 2000-260499 A | 9/2000 |
| JP | 2000-323196 A | 11/2000 |
| JP | 2001-266971 A | 9/2001 |
| JP | 2002-151169 A | 5/2002 |
| JP | 2003-297451 A | 10/2003 |
| JP | 2004-206905 A | 7/2004 |
| JP | 2006-4901 A | 1/2006 |
| JP | 4-319267 B2 | 8/2009 |
| JP | 4-342969 B2 | 10/2009 |
| NZ | 229301 A | 11/1990 |
| WO | WO 92/15127 A1 | 9/1992 |
| WO | WO 92/15128 A1 | 9/1992 |
| WO | WO 93/21676 A1 | 10/1993 |
| WO | WO 95/10863 A1 | 4/1995 |
| WO | WO 99/00873 A1 | 1/1999 |
| WO | WO 00/02288 A1 | 1/2000 |
| WO | WO 00/08719 A1 | 2/2000 |
| WO | WO 00/08720 A1 | 2/2000 |
| WO | WO 00/33424 A1 | 6/2000 |
| WO | WO 01/56115 A2 | 8/2001 |
| WO | WO 2005/064750 A1 | 7/2005 |
| WO | WO 2007/038939 A1 | 4/2007 |
| WO | WO 2007/071968 A2 | 6/2007 |
| WO | WO 2009/059335 A1 | 5/2009 |
| ZA | 9805588 | 1/1999 |

OTHER PUBLICATIONS

English language translation of Peruvian Opposition Brief filed May 6, 2013 by Famesa Explosivos S.A.C., Case file: 603-2012/DIN, 41 pages total.

Chilean Opposition Brief filed on Aug. 31, 2012 by Dyno Nobel, Inc., Application No. 1165-2012, 4 pages.

Peruvian Opposition Brief filed May 6, 2013 by Famesa Explosivos S.A.C., Case file: 603-2012/DIN, 41 pages total.

Extended European Search Report issued in European Patent Application No. 10887704.7 dated Mar. 13, 2014.

* cited by examiner

CONNECTOR, AND METHODS OF USE

CROSS REFERENCE TO RELATED APPLICATIONS

This application is the National Phase of PCT/AU2010/001448 filed on Oct. 29, 2010, which claims priority under 35 U.S.C. §119(e) to U.S. Provisional Application No. 61/257,572 filed on Nov. 3, 2009, all of which are hereby expressly incorporated by reference into the present application.

FIELD OF THE INVENTION

The invention relates to the field of blasting, and in particular to electrical connection between components of a blast apparatus at a blast site.

BACKGROUND TO THE INVENTION

Mining operations require blasting events that employ a plurality of detonators, each associated with an explosive charge. Often, the explosive charges are positioned within boreholes drilled into the rock to be blasted, and electric or electronic detonators are placed in association with the explosive charges, such that actuation of each detonator causes initiation of its associated explosive charge.

The electric or electronic detonators are remotely controlled via one or more associated blasting machines, of any type that is known in the art. Each blasting machine transmits command signals to each detonator such as ARM, DISARM, FIRE signals as well as other signals to program electronic detonators with information relevant to the blast such as detonator delay times. Traditionally, such command signals are transmitted from a blasting machine along wires that provide electrical connection from the blasting machine to each detonator. Traditionally, two type of wires are present at the blast site: (1) a trunk line (also known as a bus-wire or harness wire), which extends from the blasting machine to the general locality of the detonators; and (2) branch lines (also known as leg wires if they extend directly from a detonator), which provide electrical contact from the detonators to the trunk line.

Typically, branch lines are more robust than trunk lines, and often have larger diameters, because they are required to extend through a borehole to provide the required contact between the detonator and the trunk line. During setup of the blast apparatus, each detonator is placed in a borehole in association with an explosive charge, with the branch line (i.e. leg-wire extending from the detonator) extending up and out of the borehole. Conditions within the borehole, and various forces applied to the branch line, may cause abrasion and/or tugging on the branch line. For example, during stemming material such as gravel is added either to fill the borehole, or to provide spatial separation between decks of explosive charges and detonators. Thus, a borehole may include several detonators, each with a leg wire extending through and out of the borehole. Once the first (often the deepest) explosive charge and detonator has been positioned in the borehole, stemming material may be poured or shoveled into the borehole either manually or by machine, about the leg wire extending from the first detonator, before a second explosive charge and detonator are added to the borehole. A skilled artisan will therefore appreciate the need for robust leg-wires to prevent damage or breakage of the legwires, and to maintain electrical contact between the detonator and the harness wire.

Various connectors are known in the art to provide connection between branch line extending from a detonator, and a harness wire. Such connectors are sometimes known as insulation displacement connectors (IDCs) because they are required to displace insulating material that sheaths the electrically conductive material of the wire, in order to provide electrical contact between the wires. Typically, such connectors include some form of electrical terminal or bridge so that at least two wires (e.g. a trunk line and a branch line) may be held in close proximity and in electrical contact with the electrical terminal or bridge. Examples of such connectors are provided by U.S. Pat. No. 6,299,472 issued Oct. 9, 2001, and U.S. Pat. No. 6,442,755 issued Sep. 3, 2002, both of which are incorporated herein by reference.

Whilst the connectors of the prior art provide useful connectivity between trunk lines and branch lines, there use is somewhat limited to specific types of lines. There is a need in the art for connectors that are more versatile in terms of their ability to connect various types of wires at the blast site. There is also a need in the art for alternative methods for providing electrical connection between various components of a blast apparatus.

SUMMARY OF THE INVENTION

In certain exemplary embodiments there are provided connectors for causing electrical contact between at least two lengths of trunk line and/or branch line, the connectors comprising:
(a) hinge means;
(b) two components at least one of which comprises terminal means, the two components connected together via the hinge means such that the two components are movable relative to one another between an open position to receive the at least two lengths of trunk line and/or branch line, and a closed position in which the two components engage one another with one component overlying the other component to retain the at least two lengths of line in electrical contact with the terminal means such that the lines are in electrical contact with one another, at least one of the components including line retention slots, wherein the line retention slots all have essentially the same width such that they can each receive and retain line of the same dimensions in each slot, so that a user of the connector can place either a trunk line or a branch line having the same dimensions into any of the line retention slots; and
(c) a releasable catch for reversibly securing the two components to one another in the closed position.

In further exemplary embodiments there are provided methods for connecting at least two lengths of trunk line and/or branch line at a blast site, the methods comprising the steps of:
(a) providing a connector comprising:
  i. hinge means;
  ii. two components at least one of which comprises terminal means, the two components connected together via the hinge means such that the two components are movable relative to one another between an open position to receive the at least two lengths of trunk line and/or branch line, and a closed position in which the two components snap together with one component overlying the other component to retain the at least two lengths of line in electrical contact with the terminal means such that the lines are in electrical contact with one another, at least one of the components including line retention slots, wherein the line retention slots all have essentially the same width such that they can each receive and retain line of the same dimensions in each slot, so that a user of the connector may place either a trunk line or a branch line having the same dimensions into any of the line retention slots; and iii. a releasable catch for reversibly securing the two components to one another in the closed position;

(b) placing a first branch line or a first trunk line into any line retention slot of the connector;

(c) placing a second branch line or trunk line into any line retention slot of the connector other than the line retention slot retaining the first line;

(d) moving the two components about the hinge means from the open to the closed position, thereby to retain the first and second lines in electrical contact with one another regardless of whether they are trunk lines or branch lines;

wherein steps (b) and (c) are performed simultaneously or sequentially in any order.

In further exemplary embodiments there are provided methods for providing electrical contact between a branch line extending from an electronic detonator, and a trunk line, the methods comprising the steps of:

(a) providing a connector comprising:
  i. hinge means;
  ii. two components at least one of which comprises terminal means, the two components connected together via the hinge means such that the two components are movable relative to one another between an open position to receive the at least two lengths of trunk line and/or branch line, and a closed position in which the two components engage one another with one component overlying the other component to retain the at least two lengths of line in electrical contact with the terminal means such that the lines are in electrical contact with one another, at least one of the components including line retention slots, wherein at least a first line retention slot extends unidirectionally from the terminal means, to accommodate a first line extending to and terminating at the terminal means, and a second line retention slot extends bidirectionally from the terminal means, to accommodate a second line extending through the connector with electrical contact with the terminal means; and
  iii. a releasable catch for reversibly securing the two components to one another in the closed position;
  the connector being in the open position;

(b) placing the branch line into the second line retention slot;

(c) placing the trunk line into any other line retention slot;

(d) moving the components of the connector to the closed position thereby to establish electrical contact between the branch line and the trunk line;

wherein steps (b) and (c) may be performed simultaneously or sequentially in any order.

In further exemplary embodiments there are provided methods for joining two trunk lines in electrical contact with one another, the methods comprising the steps of:

(a) providing a connector comprising:
  i. hinge means;
  ii. two components at least one of which comprises terminal means, the two components connected together via the hinge means such that the two components are movable relative to one another between an open position to receive the at least two lengths of trunk line and/or branch line, and a closed position in which the two components engage one another with one component overlying the other component to retain the at least two lengths of line in electrical contact with the terminal means such that the lines are in electrical contact with one another, at least one of the components including line retention slots, wherein the line retention slots all have essentially the same width such that they can each receive and retain line of the same dimensions in each slot, so that a user of the connector can place either a trunk line or a branch line having the same dimensions into any of the line retention slots; and
  iii. a releasable catch for reversibly securing the two components to one another in the closed position;
  the connector being in the open position;

(b) placing a first trunk line into any line retention slot;

(c) placing a second trunk line into any other retention slot;

(d) moving the components of the connector to the closed position thereby to establish electrical contact between the trunk lines;

wherein steps (b) and (c) may be performed simultaneously or sequentially in any order.

In further exemplary embodiments there are provided methods for backing up an electrical connection between a trunk line and a branch line extending from a detonator, the method comprising the steps of:

(a) providing a connector comprising:
  i. hinge means;
  ii. two components at least one of which comprises terminal means, the two components connected together via the hinge means such that the two components are movable relative to one another between an open position to receive the at least two lengths of trunk line and/or branch line, and a closed position in which the two components engage one another with one component overlying the other component to retain the at least two lengths of line in electrical contact with the terminal means such that the lines are in electrical contact with one another, at least one of the components including line retention slots, wherein at least a first line retention slot extends unidirectionally from the terminal means, to accommodate a first line extending to and terminating at the terminal means, and second and third line retention slots extend bidirectionally from the terminal means, to accommodate second and third lines extending through the connector for electrical contact with the terminal means; and
  iii. a releasable catch for reversibly securing the two components to one another in the closed position;
  the connector being in the open position;

(b)(i) placing one portion of the trunk line into the second line retention slot;

(b)(ii) placing a second portion of the trunk line into the third line retention slot;

(c) placing a branch line into the first line retention slot;

(d) moving the components of the connector to the closed position thereby to establish electrical contact between the trunk line and the branch line;

wherein steps (b), (c) and (d) may be performed simultaneously or sequentially in any order.

Further exemplary embodiments provide for methods for establishing electrical connection between detonators located in a single borehole, the method comprising the steps of:

(a) designating one branch line extending from a first detonator located in the borehole as a main branch line;

(b) attaching every other branch line each extending from each subsequent detonator in the borehole to a portion of the main branch line extending above the ground, via connectors as described herein, such that the order of the connectors attached to the main branch line corresponds to the order of the detonators located in the borehole; and (c) optionally attaching the main branch line extending above the ground to a trunk line.

DEFINITIONS

Base charge: refers to any discrete portion of explosive material in the proximity of other components of the detonator and associated with those components in a manner that allows the explosive material to actuate upon receipt of appropriate signals from the other components. The base charge may be retained within the main casing of a detonator, or alternatively may be located nearby the main casing of a detonator. The base charge may be used to deliver output power to an external explosives charge to initiate the external explosives charge.

Blasting machine: refers to any device that is capable of being in signal communication with electronic detonators, for example to send ARM, DISARM, and FIRE signals to the detonators, and/or to program the detonators with delay times and/or firing codes. The blasting machine may also be capable of receiving information such as delay times or firing codes from the detonators directly, or this may be achieved via an intermediate device to collect detonator information and transfer the information to the blasting machine.

Branch line/leg wire: refers to any electrical wire of any configuration and of any cross-sectional shape that extends either by connection to a trunk line, or that extends from an electronic detonator for connection, either directly or indirectly, to a trunk line. For example the branch line or leg wire may be uniplex (i.e. have only one wire of electrically conductive material extending therethrough), duplex (i.e. have two wires of electrically conductive material extending therethrough), or multiplex (i.e. have more than two wires of electrically conductive material extending therethrough). Any form of electrically insulating material may be used to sheath the outside of the line or wire, and the line or wire may take any configuration in cross-section, including for example a web to connect more than one sheathed wire together.

Central command station: refers to any device that transmits signals via radio-transmission or by direct connection, to one or more blasting machines. The transmitted signals may be encoded, or encrypted. Typically, the central blasting station permits radio communication with multiple blasting machines from a location remote from the blast site.

Connector: refers to a connector of the prior art or of the invention as described herein, for providing a secure electrical contact between two or more wires or lines, for example at a blast site. In selected embodiments, a connector is an "insulation displacement connector" because the connector includes a component or components or means to cause displacement or otherwise move insulation material such as electrically insulating sheathing material that sheaths a wire of electrically conductive material. Such connectors are known in the art, as described for example in U.S. Pat. No. 6,299,472 issued Oct. 9, 2001, and U.S. Pat. No. 6,442,755 issued Sep. 3, 2002, both of which are incorporated herein by reference.

Figure 4:
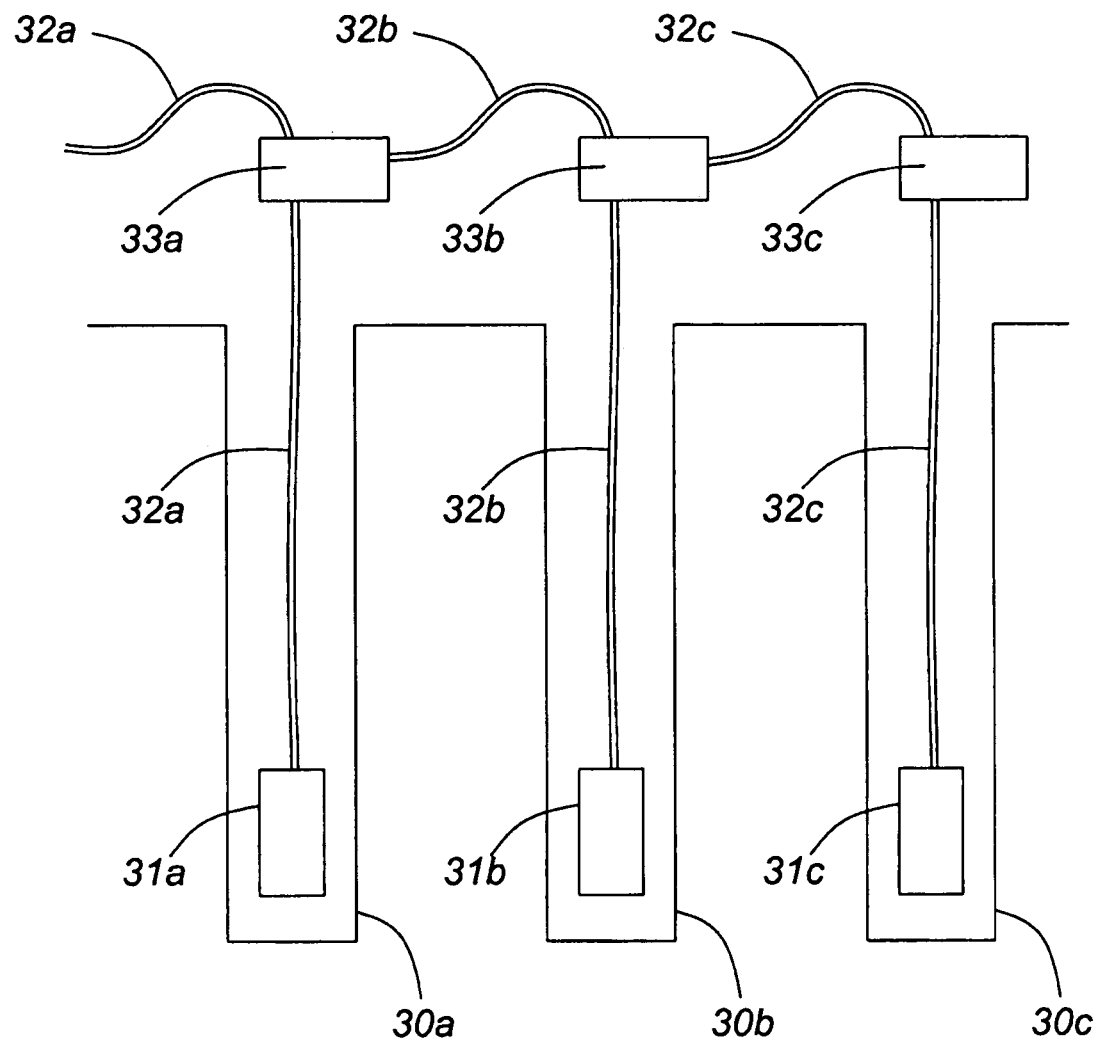
FIG. 4 illustrates "daisy-chain" connections between detonators, in accordance with one method disclosed herein.

Daisy-chain connection: refers to electrical connection between detonators or other components in a manner the same as or similar to that shown in FIG. 4.

Engage: refers to the contact and physical association of two components of a connector as described herein. By engaging one another the two components are held together (or held by one another) such that release of the two components from a closed or engaged position required a specific action of the user, such as for example movement or manipulation of a release catch. In selected embodiments of the connector there may be juxtaposition of specific portions (e.g. tabs or ridges) of the components such that flex resiliently just prior to a final engaged position, such that when the components move together sufficiently into the engaged position the resilient flex of the portions is released to move the portions into a position that resists opening or disengagement of the components from one another. In more selected embodiments the release of the resilient flex may be accompanied by a snap action or an audible click such that a user is aware, by sensory perception, that the components are properly engaged in a closed position, for example to hold the retained lines or wires in desired line retention slots. In further selected embodiments the snap action or release of resilient flex may drive the components together into an engaged relationship, such that the force of engagement assists the terminal means in displacing sheathed material of the wires, thereby to facilitate contact between the terminal means and the electrically conductive material within the wires or lines.

Explosive charges: refers to any quantity and type of explosive material that is located near or adjacent a detonator, such that actuation of the detonator causes subsequent ignition of the explosive material. For example, the explosive material may be located or positioned down a borehole in the rock, and a detonator optionally together with a booster may be located in operative association with the explosive material down or near to the borehole. In preferred embodiments the explosive material may comprise pentolite, TNT, or an explosive emulsion composition.

Hinge means: refers to any device that permits two component parts of a connector as described herein to be fixed together and yet be able to move, swing, or be hinged thereby to permit movement of the components relative to one another. Examples of hinges include, but are not limited to, those made from a flexible material such as a plastic or metal sheet or web, as well as mechanical hinges of the type that is well know for doors or other swung devices.

Preferably: identifies preferred features of the invention. Unless otherwise specified, the term preferably refers to preferred features of the broadest embodiments of the invention, as defined for example by the independent claims, and other inventions disclosed herein.

Terminal means: refers to any component or group of components that provide electrical contact from one place to another, wherein the places of contact are for contact with a line or wire. Typically, a terminal means comprises a metallic material to provide an electrically conductive 'bridge' suitable to form electrical contact between two or more wires or lines if retained in a connector as described herein. Optionally, the places of contact may include spikes or other means to pierce or displace insulating sheathing material that may conceal electrically conductive material of the wire or line therebeneath.

Trunk line/harness wire: refers to any line or wire that extends across a blast site to provide electrical connection between components of a blasting apparatus that are reasonably well distanced from one other. For example, a trunk line may provide electrical contact between a blasting machine and extend to the vicinity of one or more boreholes in the rock at the blast site, and then connect with one or a plurality of branch lines to contact the detonators themselves, for example located down boreholes drilled into the rock. The trunk line or harness wire may take any configuration, and have any dimensions suitable to achieve such electrical contact. For example the trunk line or harness wire may be uniplex (i.e. have only one wire of electrically conductive material extending therethrough), duplex (i.e. have two wires of electrically conductive material extending therethrough), or multiplex (i.e. have more than two wires of electrically conductive material extending therethrough). Any form of electrically insulating material may be used to sheath the outside of the line or wire, and the line or wire may take any configuration in cross-section, including for example a web to connect more than one sheathed wire together.

Wire or line: refers to any wire or line that is able to accept and transmit at least one electronic signal such as a command signal to FIRE from a blasting machine to a detonator. A line, in selected embodiments, may also be able to transmit signals from a detonator back to a blasting machine, or signals between detonators. The wire or line may be manufactured and shipped for attachment to a detonator or another component of the blasting apparatus such as an attachment cap. Alternatively, the signal transmission line may be factory assembled attached to a detonator or attachment cap or other component, thereby to provide a leg-wire.

DETAILED DESCRIPTION OF THE INVENTION

Through significant research efforts, the inventors have developed connectors and methods for providing electrical contact between components of a blasting apparatus at a blast site. Importantly, the connectors and methods permit versatile connectivity between components at the blast site, so that the wiring set-up between blasting machines and detonators, or between the detonators themselves, can be varied significantly. Importantly, this opens the door to alternative wiring configurations between components of the blasting apparatus at the blast site. Moreover, since detonators are often manufactured and shipped with attached leg-wires (i.e. branch lines), the new methods reduce the need to manufacture and ship many different detonator/leg wire combinations.

The invention encompasses, at least in preferred embodiments, an improved connector for making electrical contact between various lines at the blast site. The connector can, at least in preferred embodiments, retain two or more lines in electrical contact with one another, wherein the lines are of substantially the same or similar diameter or dimension. Unlike the connectors of the prior art, the connectors are not limited to retain trunk lines extending therethrough, and branch lines terminating therein. A branch line may be positioned in the connector where traditionally a trunk line may be located, and vice versa a trunk line may be positioned such that it terminates in the connector in a position where a branch line may traditionally be located. Therefore, selected connectors include slots for retaining trunk lines or branch lines in electrical contact with an electrical terminal means, without preference as to which line is located in which slot.

This contrasts directly with other connectors known in the art, which are designed and configured for retaining one or more trunk lines extending through the connectors, and a branch line extending into and terminating at the connector (see for example U.S. Pat. No. 6,299,472 issued Oct. 9, 2001, and U. S. Pat. No. 6,443,755 issued Sep. 3, 2002, both of which are incorporated herein by reference). Thus, the connectors disclosed herein are tremendously versatile with regard to their connectivity, by virtue of their capacity to receive trunk lines or branch lines in any line retention slot, regardless of whether it extends through or terminates at the connector. This in turn opens the door to a wide range of wiring arrangements and connection methods at the blast site.

Thus, in one selected embodiment there is disclosed herein a connector for electrical contact between at least two lengths of trunk line and/or branch line, the connector comprising:
  hinge means;
  two components at least one of which comprises terminal means, the two components connected together via the hinge means such that the two components are movable relative to one another between an open position to receive the at least two lengths of trunk line and/or branch line, and a closed position in which the two components engage one another with one component overlying the other component to retain the at least two lengths of line in electrical contact with the terminal means such that the lines are in electrical contact with one another, at least one of the components including line retention slots, wherein the line retention slots all have essentially the same width such that they can each receive and retain line of the same dimensions in each slot, so that a user of the connector can place either a trunk line or a branch line having the same dimensions into any of the line retention slots; and
  a releasable catch for reversibly securing the two components to one another in the closed position.

The hinge means may take any form suitable to provide attachment and relative movement to the two components of the connector. For example, the hinge means may include flexible materials such as a plastic material, or may take the form of a mechanical hinge device having a configuration similar to a traditional door hinge. Each component is a generally rigid component and optionally is mainly comprised of an electrically insulating material. For example, each component may be made or molded or otherwise formed from any type of plastic or resinous material. The terminal means may take any form or configuration to provide electrical contact between the lines retained by the retainer. For example, the terminal means may comprise an electrically conductive material such as a metal, with spikes or other piercing portions suitable to pierce or otherwise displace any insulating sheath material of each line, thereby to provide contact between the terminal means and the electrically conductive wire material of each line, located generally beneath the sheath material. Other portions of the terminal means may provide a 'bridge' for electrical contact between the lines making electrical contact with the terminal means. Thus, in selected embodiments the terminal means forms part of a connector known as an "insulation displacement connector" or IDC.

In further selected embodiments the metal surfaces of the terminal means may be at least partially coated with an insulator material (e.g. nylon or powdered nylon) to reduce current leaking during operative use of the connectors. The inventors are aware that such current leakage may occur, or be more prevalent; when terminals used in connectors of any description merely comprise exposed or naked metal. Thus, the connectors described herein, or indeed any similar connectors in the art, may benefit from the use of terminal or terminal means produced for example from nylon-powder-coated metal sheets, or alternatively produced by powder-coating metal components following their stamping from metal sheets. Only newly cut or non-coated surfaces may then be amenable to electrical contact, thus reducing the total surface area of exposed metal, which in turn may reduce unwanted current leakage from the terminal means thus produced.

In selected embodiments the connector comprises at least a first line retention slot extending unidirectionally (in just one direction) from the terminal means, to accommodate a first line extending to and terminating at the terminal means, and a second line retention slot extending bidirectionally (in two directions) from the terminal means, to accommodate a second line extending through the connector with electrical contact with the terminal means. In this way the connector may include a slot that may traditionally retain a branch line (the first line retention slot) and another slot that may traditionally retain a trunk line (the second line retention slot). The connector, by virtue of its configuration, thus permits the branch line to instead be located in the second slot extending through the connector. Optionally, the first and second line retention slots extend substantially perpendicular to one another.

Optionally, the connector may further comprise a third line retention slot extending bidirectionally from the terminal means, to accommodate a third line extending through the connector with electrical contact with the terminal means. The usefulness of the third line retention slot will be more apparent from the foregoing discussion of the methods of the invention. Optionally, the second and third line retention slots extend through the connector substantially parallel with one another, and perpendicular to the first line retention slot.

It should also be noted that the connectors of the invention may be configured to receive any type of line, including both uniplex (single wire) lines, duplex (two wire lines) and multiplex lines. Each line retention slot may be adapted to receive a different or the same type of line. Again, the second and third line retention slots optionally accommodate lines of the same dimension or size.

Optionally, the terminal means includes spikes of electrically conductive material positioned to protrude into each line retention slot to pierce through or otherwise displace insulation material of each line when positioned in each slot, such that each spike makes electrical contact with electrically conductive material of each line running beneath the insulation material.

In other exemplary embodiments there is provided a use of a connector as disclosed herein, to connect in electrical contact two lines of the same width, type or dimension, thereby to provide electrical contact between a detonator and another component of a blasting apparatus at a blast site. Optionally, the other component is another detonator.

Figure 1A:
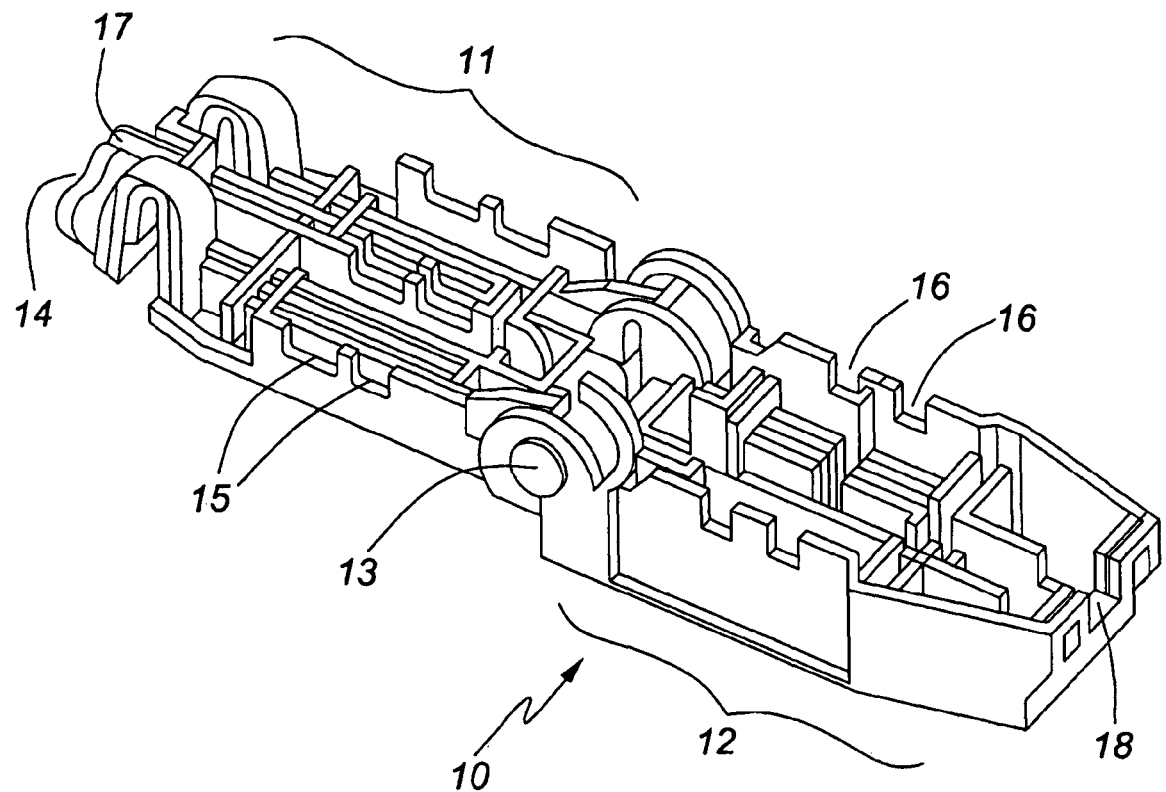
FIG. 1a illustrates an example connector, in an open position ready to receive a trunk line and/or a branch line.
Figure 1B:
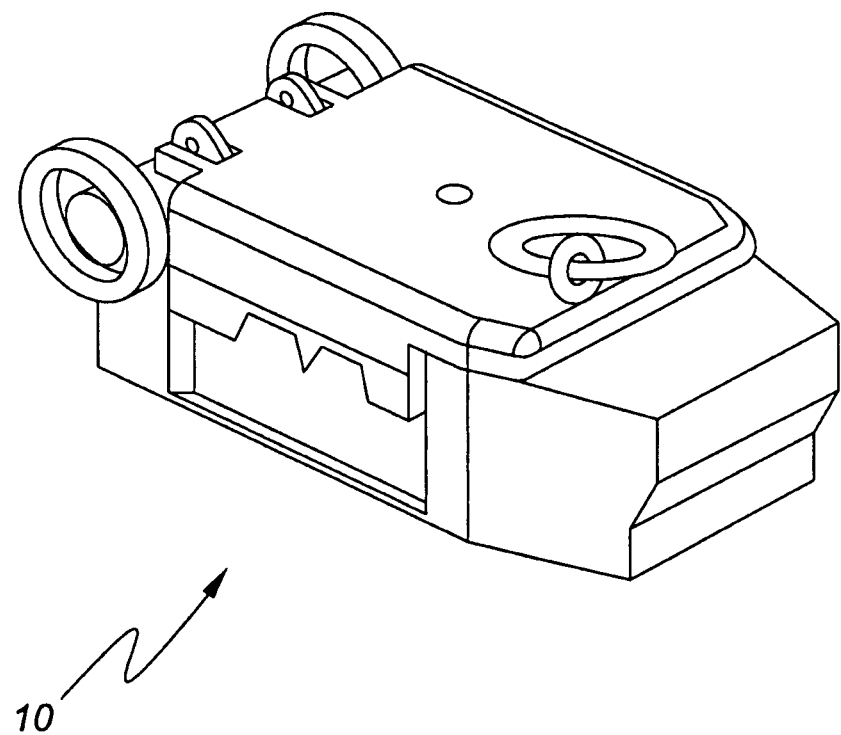
FIG. 1b illustrates the connector shown in FIG. 1a moved from an 'open' to a 'closed' position for retention of any lines positioned in the line retention slots.

An example connector is illustrated in FIG. 1. In FIG. 1a the general body 10 of the connector is shown to include components 11 and 12 attached via hinge 13. The connector includes a releasable catch (labeled as clasp 14) that permits a snap-shut action upon movement of component 11 about hinge 13 to meet component 12. FIG. 1b illustrates the same connector but shown in a closed position compared to FIG. 1a. Line retention slots 15 and 16 are dimensioned to accommodate lines (not shown) therein extending through the connector, and they co-operate to retain the lines in the connector when the components are moved to a closed position. Line retention slots 17 and 18 are dimensioned to receive a line extending into and terminating at the connector when the components are moved to a closed position. The line retention slots 15, 16, 17, 18 are dimensioned to receive the same sized lines, so that either a branch line or a trunk line may be accommodated in any slot.

Figure 2A:
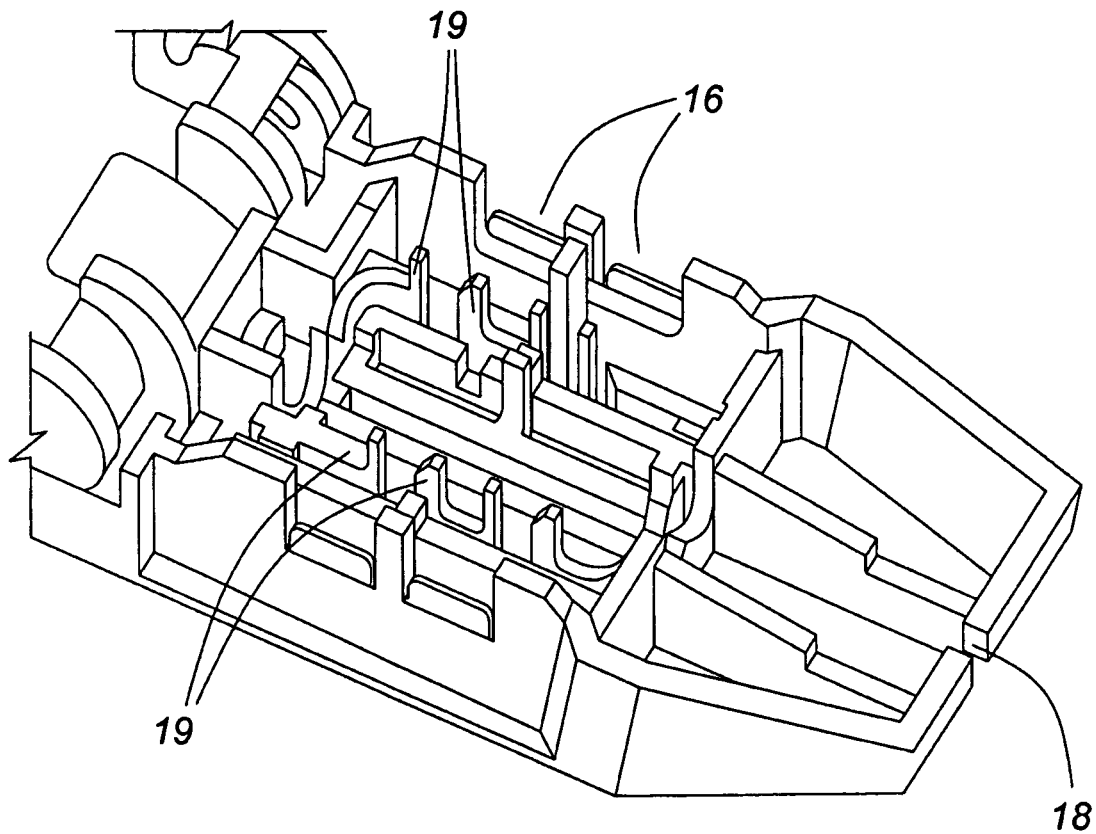
FIG. 2a illustrates a closer view of the portion of the connector shown in FIG. 1.

The line retention slots 16 and 18 of component 12 are better illustrated with reference to FIG. 2a, which provides a closer view of a portion of the connector 10. Also shown in more detail are metal insulation displacement components 19 (which appear as metallic points) that together with other metallic portions (not shown) provide terminal means for electrical contact between lines retained by the connector in the closed position.

Figure 2B:
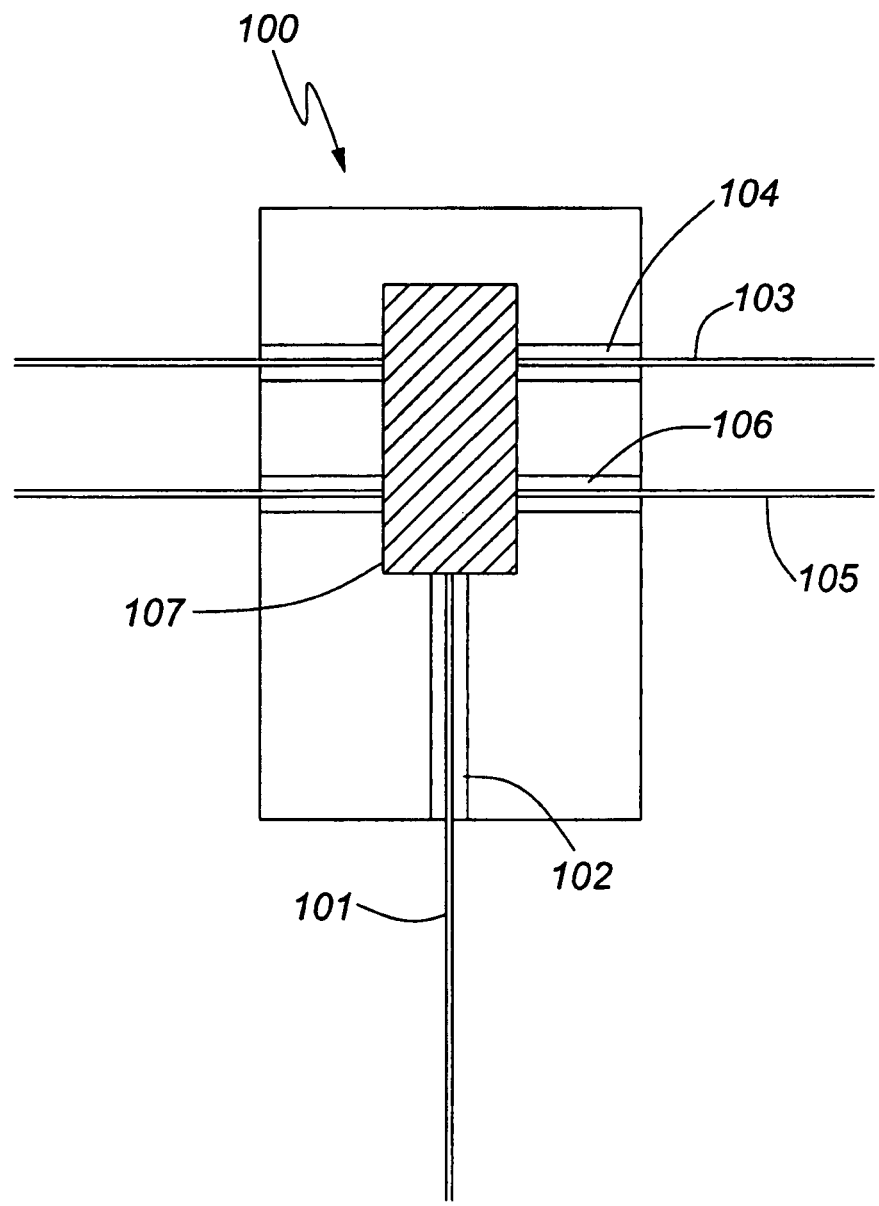
FIG. 2b schematically illustrates an example connector indicating the position of three line retention slots in accordance with subsequently illustrated and described embodiments.

FIG. 2b schematically illustrates a connector 100 of the present invention, retaining a first line 101 in first line retention slot 102, a second line 103 running though second line retention slot 104, and a third line 105 running though third line retention slot 106. Each of lines 101, 103 and 105 makes electrical, contact with terminal means 107, with line 101 terminating at the terminal means 106 and extending unidirectionally out of the connector. In contrast, lines 103 and 105 extend through their respective line retention slots again with electrical contact with terminal means 107 (i.e. lines 103 and 105 extend bidirectionally out of the connector). In this way, and by virtue of the terminal means comprising electrically conductive material, the lines 101, 103 and 105 are brought into electrical contact with one another. For schematic illustration, each connector is illustrated to include a 'short side' from which the first line retention slot can accommodate a first line, and 'long sides' from which second and third line retention slots may accommodate second and third lines. The schematic illustration of the connector shown in FIG. 2a applies to subsequently illustrated embodiments, even though the presence of a terminal means nor lines running though the connector will not necessarily be shown.

Figure 3:
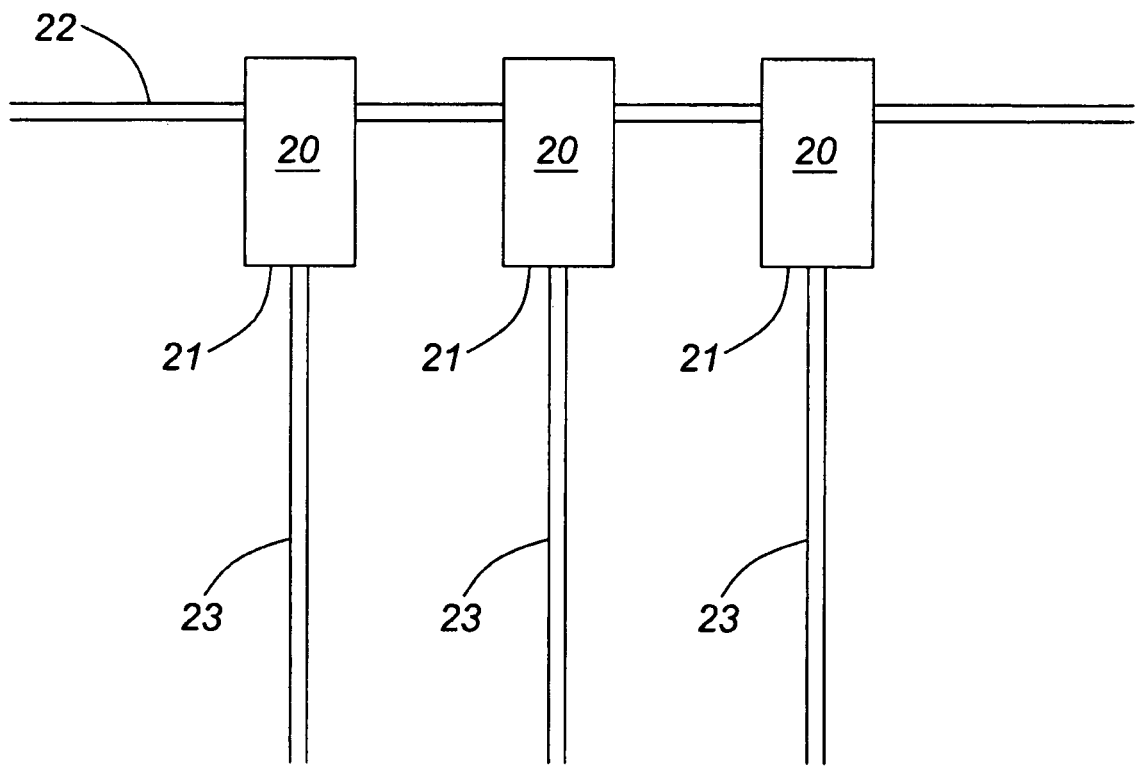
FIG. 3 illustrates connections between a trunk line and branch line, made in a traditional manner.

Further exemplary embodiments encompass methods for providing electrical contact between components of a blasting apparatus at a blast site, and at least some of these methods involve the use of connectors as disclosed herein. When referring to FIGS. 3 to 9, it is important to note that for simplicity each connector is illustrated as a grey rectangle with connection of associated lines to a terminal means forming part of each connector not being shown. With reference to FIG. 3 the connectors are shown as rectangles 20. FIG. 3 illustrates a 'traditional' wired arrangement at the blast site, with trunk line 22 extending through each connector 20 via a slot extending through the connector (not shown, but corresponding to the second or third slot of the connector described above). In contrast, branch lines 23 extend into each connector 20 via line retention slots (not shown) corresponding to the first slot of the connector described above, which terminate at the terminal means (not shown). Thus, FIG. 3 illustrates a traditional set up in which branch lines (for example extending to detonators down boreholes) are connected onto the trunk line via the use of connectors 20. In FIGS. 4-9 the connectors will be illustrated assuming the same orientation with the first line retention slot terminating at the terminal means extending from short side 21 of each connector 20.

In contrast, selected methods involve the use of a connector in which the branch line (which would normally enter the connector via short side 21, and terminate in the connector) is instead attached to a different line retention slot extending through the connector. This is permitted, at least in selected embodiments, by virtue of the features of the connectors disclosed herein. For example, selected embodiments provide for methods for connecting at least two lengths of trunk line and/or branch line at a blast site, the method comprising the steps of:

(a) providing a connector comprising:
  i. hinge means;
  ii. two components at least one of which comprises terminal means, the two components connected together via the hinge means such that the two components are movable relative to one another between an open position to receive the at least two lengths of trunk line and/or branch line, and a closed position in which the two components engage one another with one component overlying the other component to retain the at least two lengths of line in electrical contact with the terminal means such that the lines are in electrical contact with one another, at least one of the components including line retention slots, wherein the line retention slots all have essentially the same width such that they can each receive and retain line of the same dimensions in each slot, so that a user of the connector may place either a trunk line or a branch line having the same dimensions into any of the line retention slots; and
  iii. a releasable catch for reversibly securing the two components to one another in the closed position;
(b) placing a first branch line or a first trunk line into any line retention slot of the connector;
(c) placing a second branch line or trunk line into any line retention slot of the connector other than the line retention slot retaining the first line;
(d) moving the two components about the hinge means from the open to the closed position, thereby to retain the first and second lines, in electrical contact with one another regardless of whether they are trunk lines or branch lines;
wherein steps (b) and (c) are performed simultaneously or sequentially in any order.

The use of a connector as described herein thus permits the branch line, which would normally be placed in the first slot of the connector, to instead be placed in the second slot of the connector. Optionally, and to facilitate such methods, all lines connected to the connector may have the same diameter.

Further, the invention provides for methods for providing electrical contact between a branch line extending from an electronic detonator, and a trunk line, the method comprising the steps of:

(b) providing a connector comprising:
  i. hinge means;
  ii. two components at least one of which comprises terminal means, the two components connected together via the hinge means such that the two components are movable relative to one another between an open position to receive the at least two lengths of trunk line and/or branch line, and a closed position in which the two components engage one another with one component overlying the other component to retain the at least two lengths of line in electrical contact with the terminal means such that the lines are in electrical contact with one another, at least one of the components including line retention slots, wherein at least a first line retention slot extends unidirectionally from the terminal means, to accommodate a first line extending to and terminating at the terminal means, and a second line retention slot that extends bidirectionally from the terminal means, to accommodate a second line extending through the connector with electrical contact with the terminal means; and
  iii. a releasable catch for reversibly securing the two components to one another in the closed position;
the connector being in the open position;
(b) placing the branch line into the second line retention slot;
(c) placing the trunk line into any other line retention slot;
(d) moving the components of the connector to the closed position thereby to establish electrical contact between the branch line and the trunk line;
wherein steps (b) and (c) may be performed simultaneously or sequentially in any order.

Such methods open the door to an entirely new range of blast apparatus wiring arrangements at the blast site, and methods of providing electrical connection between components at the blast site. One such example is illustrated in FIG. 4. For ease of illustration just three boreholes 30a, 30b, 30c are shown in cross-section. Detonators 31a, 31b, 31b are shown at the bottom of each borehole, with lines 32a, 32b, 32c extending from the detonators. Importantly, line 32a extends from detonator 31a into the second slot of connector 33a, even though the line 32a may be considered a branch line or a leg wire extending directly from detonator 31a. Likewise line 32b extending from detonator 31b passes into and through the second line retention slot of connector 33b and continues until it passes into the first slot of connector 33a. Further, line 32c extends from detonator 31c and through the second slot of connector 33c and continues until it passes into the first slot of connector 33b. This configuration pertains to a "daisy-chain" of connected detonators, wherein the legwire of each detonator is in effect used to provide an extension to the trunk line. For example, if line 32a represents an end of a length of trunk line, then the trunk line will terminate at detonator 31a. With connectors of the prior art, there would be no option to connect further detonators extending further from the blasting machine at the end of trunk line 32a. However, by virtue of the versatility of the connectors and methods disclosed herein, further detonators may be connected by using their leg wires as extension wires. This is possible because connectors 33a, 33b, 33c are configured or dimensioned to permit either trunk lines or branch lines to be retained by any line retention slot, regardless of whether the slot passes through or terminates within the connector.

Optionally, for reasons that will become apparent from selected methods discussed below, in step (a) the connector of the invention may further comprise a third line retention slot extending bidirectionally from the terminal means, to accommodate a third line extending through the connector with electrical contact with the terminal means. For example in step (c) the trunk line may extend through the third slot. In selected methods a branch line may be caused to extend through one of the second or third slots, and loop into the first slot, thereby to back-up electrical connection between the branch line and the terminal means through electrical contact with the terminal means in the first slot and the second slot. Illustrations of a corresponding wired arrangements are provided in FIGS. 5 and 6.

Figure 5:
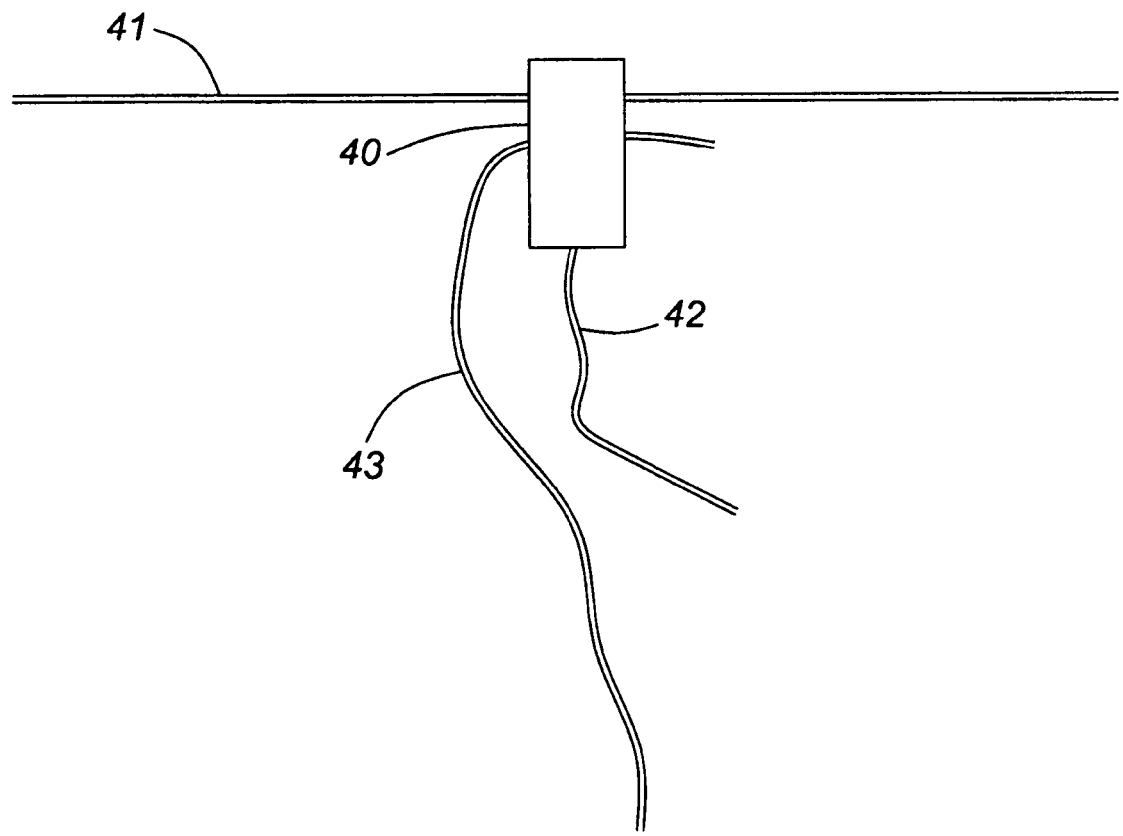
FIG. 5 illustrates how a connection between a trunk line and a branch line can be 'backed-up' in accordance with the connectors and methods disclosed herein.

In FIG. 5 there is shown a connector 40 with a trunk line 41 extending through a second slot of the connector. Traditionally, a branch line 42 is connected to the first slot of the connector, to terminate at the terminal means within the connector (not shown). However, with traditional techniques a damaged branch line 42 would need to be disconnected from the connector, and replaced with a new branch line to restore electrical contact. The connectors disclosed herein permit a user instead to insert a replacement branch line 43 (or another part of branch line 42) to be inserted into the third slot of the connector, thereby restoring electrical contact between the trunk line and the branch line.

Figure 6:
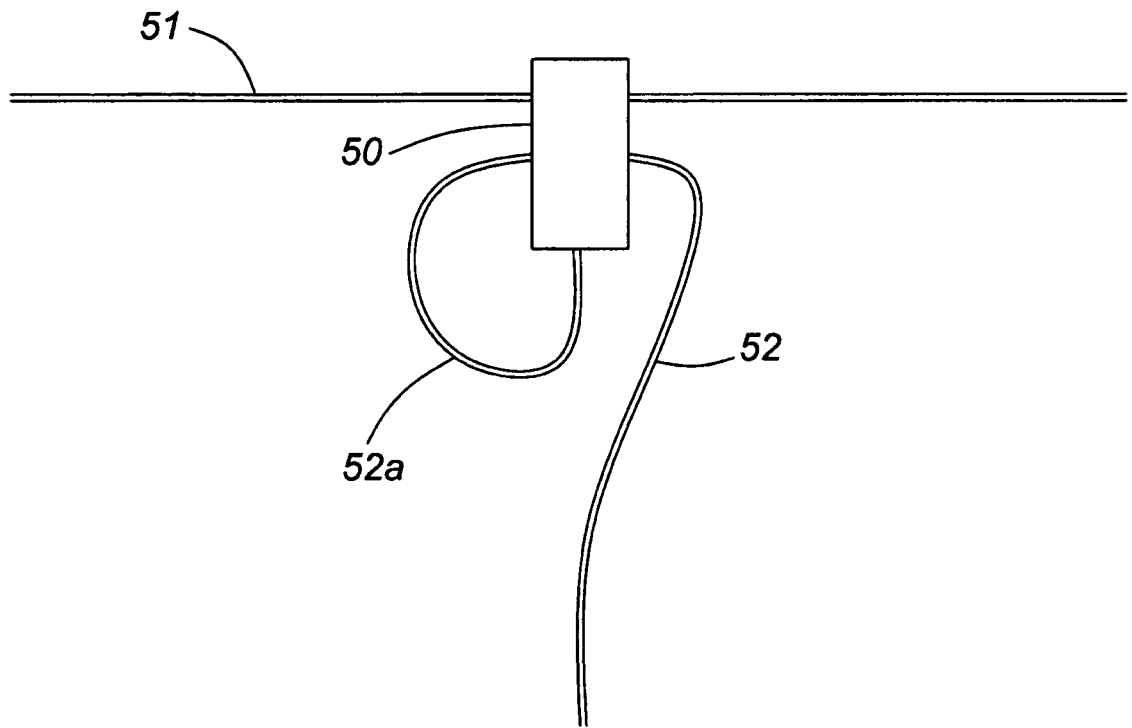
FIG. 6 illustrates how a connection between a trunk line and a branch line can be 'backed up' in accordance with the connectors and methods disclosed herein.

FIG. 6 illustrates a similar scenario to FIG. 5, in which a poor connection between a trunk line and a branch line is "backed-up" or restored. This time, connector 50 retains trunk line 51 and branch line 52. However, it will be noted that branch line 52 makes electrical contact with the connector 50 via both the first and third slots due to passage of the branch line 52 through the third slot, and looping of the branch line back to the first slot via portion 52*a*.

Figure 7:
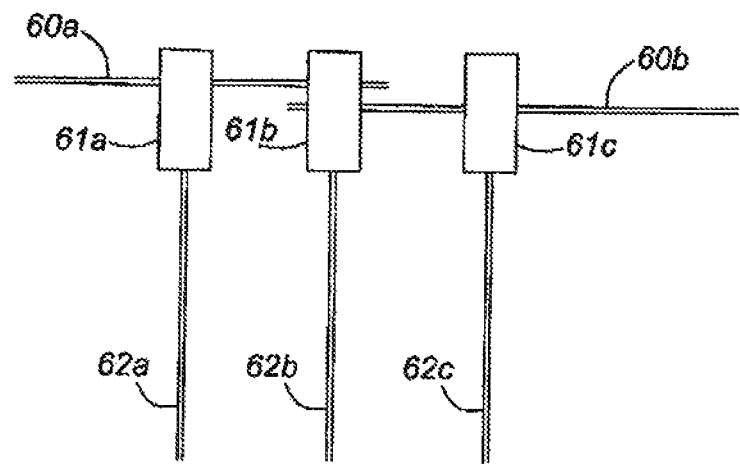
FIG. 7 illustrates connection of multiple detonators to a trunk line via branch lines, in accordance with connectors and methods disclosed herein.

Turning now to FIG. 7, there is illustrated a connection between two ends of two separate trunk lines 60*a* and 60*b*. Trunk line 60*a* passes through second slots of connectors 61*a* and 61*b*, whereas trunk line 60*b* passes through the third slots of connectors 61*b* and 61*c*. In this way, intermediate connector 61*b* provides electrical contact between the two trunk lines by virtue of its terminal means (not shown) and its capacity to receive the trunk lines. Branch lines 62*a*, 62*b*, 62*c* may extend from the connectors in the usual manner. However, it may be noted that the trunk lines need not necessarily be retained by the connector in the manner shown in FIG. 7. Indeed, any connection between the ends of the two trunk lines and any, retention slots of a single connector may be used, providing that electrical contact between the two trunk lines in a single connector is achieved. For example, one trunk line may extend into connector 61*b* via the first slot of the connector, which terminates at the terminal means, and the other trunk line may extend into any of the other line retention slots of the connector, again for connection with the terminal means.

Thus the invention further provides for a method for joining two trunk lines in electrical contact with one another, the method comprising the steps of:
(a) providing a connector comprising:
 (i) hinge means;
 (ii) two components at least one of which comprises terminal means, the two components connected together via the hinge means such that the two components are movable relative to one another between an open position to receive the at least two lengths of trunk line and/or branch line, and a closed position in which the two components engage one another with one component overlying the other component to retain the at least two lengths of line in electrical contact with the terminal means such that the lines are in electrical contact with one another, at least one of the components including line retention slots, wherein at least a first line retention slot extends unidirectionally from the terminal means, to accommodate a first line extending to and terminating at the terminal means, and second and third line retention slots extend bidirectionally from the terminal means, to accommodate second and third lines extending through the connector for electrical contact with the terminal means; and
 (iii) a releasable catch for reversibly securing the two components to one another in the closed position;
the connector being in the open position;
(b) placing a first trunk line into any line retention slot;
(c) placing a second trunk line any other line retention slot;
(d) moving the components of the connector to the closed position thereby to establish electrical contact between the trunk lines;
wherein steps (b) and (c) may be performed simultaneously or sequentially in any order.

Figure 8:
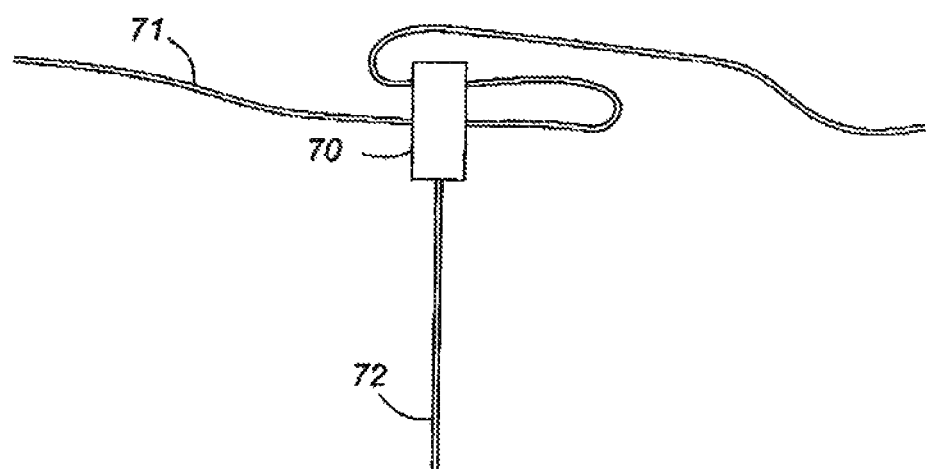
FIG. 8 illustrates connection of two harness wires in accordance with the connectors and methods disclosed herein.

FIG. 8 illustrates a still further embodiment of the invention, in which a poor connection between a trunk line and a branch line is backed up, this time by looping the trunk line twice through a single connector. In this embodiment, connector 70 has extending therethrough trunk line 71. However, trunk line 71 passes through the second slot of the connector, and is then looped back to pass through the connector a second time, through the third slot of the connector. This results in the trunk line making electrical contact with the terminal means in the connector twice, thus providing back-up in case one of the connections between the trunk line and the connector is poor. Branch line 72 extends from the first slot of connector 70 in the 'traditional' manner.

Thus the invention further provides for a method for backing up an electrical connection between a trunk line and a branch line extending from a detonator, the method comprising the steps of:
(a) providing a connector comprising:
 (i) hinge means;
 (ii) two components at least one of which comprises terminal means, the two components connected together via the hinge means such that the two components are movable relative to one another between an open position to receive the at least two lengths of trunk line and/or branch line, and a closed position in which the two components engage one another with one component overlying the other component to retain the at least two lengths of line in electrical contact with the terminal means such that the lines are in electrical contact with one another, at least one of the components including line retention slots, wherein at least a first line retention slot extends unidirectionally from the terminal means, to accommodate a first line extending to and terminating at the terminal means, and second and third line retention slots extend bidirectionally from the terminal means, to accommodate second and third lines extending through the connector for electrical contact with the terminal means; and
 (iii) a releasable catch for reversibly securing the two components to one another in the closed position;
the connector being in the open position;
(b)(i) placing one portion of the trunk line into the second line retention slot;
(b)(ii) placing a second portion of the trunk line into the third line retention slot;
(c) placing a branch line into the first line retention slot;
(d) moving the components of the connector to the closed position thereby to establish electrical contact between the trunk line and the branch line;

wherein steps (b), (c) and (d) may be performed simultaneously or sequentially in any order.

Figure 9:
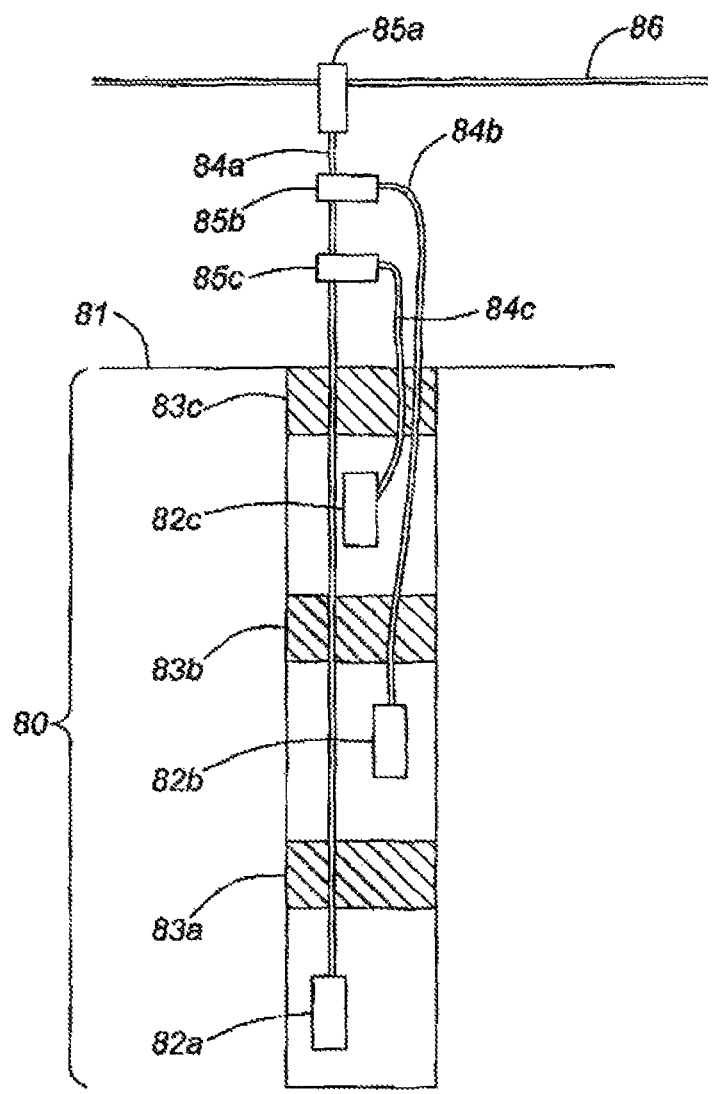
FIG. 9 illustrates how connection between a trunk line and a harness wire can be 'backed-up' in accordance with the connectors and methods disclosed herein.

Turning now to FIG. 9, there is illustrated a borehole 80 shown extending below a surface of the ground 81. The borehole has within it three separate detonators 82a, 82b, 82c (e.g. each positioned with an explosive charge) and separated by stemming decks 83a, 83b, 83c. A main branch line 84a is connected via connector 85a to trunk line 86. Branch line 84a extends virtually the entire length of borehole 80 to make electrical contact with detonator 82a in a manner similar to a traditional arrangement. However, the connectors and methods of the present invention present a significant advantage as will become apparent from the foregoing.

At a blast site, boreholes are typically drilled and loaded with explosives and detonators, with the branch lines (i.e. leg wires) of the detonators extending up from and out of the borehole. The trunk line is then extended to the borehole, and the branch lines connected via connectors to the trunk line. However, when the trunk line is extended to the borehole it can be difficult for the blast operator to remember which branch line extending from the borehole is connected to which detonator down the borehole. One way is to somehow tag each branch line when each detonator is positioned in the borehole, or alternatively colour-coded branch lines may be used. The branch lines are then connected in a desired sequence to the trunk line in the traditional manner, with each branch line extending from the first slot of each connector, and the trunk line extending through each connector.

However, in accordance with the embodiment illustrated in FIG. 9, tagging or colour coding of the branch lines during set up of the borehole is no longer required because the branch lines 84b and 84c can be connected to branch line 84a, instead of trunk line 86, via connectors 85b and 85c respectively. This is only possible due to the configuration of selected connectors disclosed herein. Even before trunk line 86 is extended to the borehole, branch lines 84b and 84c can be connected to branch line 84a, so that once the trunk line is in position only a single connection to the trunk line is required via connector 85a. Importantly, when setting up the borehole the blast operator has an opportunity to connect each of branch lines 84b and 84c to branch line 84a in an order that reflects the order of the detonators in the borehole (for example, in FIG. 9 the order of the connectors 85a, 85b, 85c is the reverse of detonators 82a, 82b, 82c, although this may be reversed in accordance with the preferences of the blast operator). Hence, there is no longer any need for the blast operator to tag or colour code the branch lines extending from the borehole during setup, and noneed to remember which colour-coded branch line is derived from which detonator. The order of the detonators will be "automatically" reflected in the order of the branch line connections to the main branch line. This is only possible due to the connectors and corresponding methods of the present invention, which permit the branch lines to be connected to each connector via any of the line retention slots.

The connectors and methods described above are exceptionally useful regardless of the nature of the blasting apparatus and its components, and the nature of the leg wires extending from the detonators. For example, the connectors of the invention, and corresponding methods for connecting branch lines/leg wires exiting a borehole, present advantages even if the leg wires are already colour-coded or tagged. However, there are many examples in the art of other blasting apparatuses that employ branch lines or leg wires without colour coding of wires, or without any other mechanism to sort and tag the leg wires at the blast site. For these particular blasting apparatuses (and their components) the connectors and methods of the present invention present extremely important advantages, by providing a mechanism to ensure proper and reliable identification of leg wires extending from a borehole without the need the modify the blast equipment in any way, and without the trouble of labeling the leg-wires in the field. The ease organization at the blast site further presents inevitable safety advantages to the blast operator.

Thus the invention further provides a method for establishing electrical connection between detonators located in a single borehole, the method comprising the steps of:
(a) designating one branch line extending from a first detonator located in the borehole as a main branch line;
(b) attaching every other branch line each extending from every other detonator in the borehole to a portion of the main branch line extending above the ground, via connectors as described herein, such that the order of the connectors attached to the main branch line corresponds to the order of the detonators located in the borehole; and
(c) optionally attaching the main branch line extending above the ground to a trunk line.

Whilst the invention has been described with reference to specific embodiments including connectors and methods involving such connectors, these embodiments are merely provided to illustrate preferred or optional features of the invention. Still further embodiments are encompassed by the invention that may extend within or beyond the scope of the appended claims.

The invention claimed is:

1. A connector for causing electrical contact between blasting components, particularly between a length of insulated line connected to a detonator and another length of insulated line connected to another blasting component, the connector comprising;
(i) hinge means;
(ii) two components at least one of which comprises terminal means with insulation displacement means, said two components being connected together via the hinge means such that the two components are movable relative to one another between an open position to receive the lengths of insulated line and a closed position in which the two components engage one another with one component overlying the other component to retain the lengths of insulated line in electrical contact with the terminal means, said terminal means providing an electrically conductive bridge such that the lengths of insulated line are in electrical contact with one another, at least one of the components including line retention slots, wherein the line retention slots comprise:
(a) a first line retention slot extending unidirectionally from said terminal means to accommodate a first of said lengths of insulated line extending to and terminating at the terminal means;
(b) a second line retention slot extending bidirectionally from said terminal means and perpendicularly to said first line retention slot, to accommodate a second of said lengths of insulated line extending through said connector in electrical contact with the terminal means; and
(iii) a releasable catch for reversibly securing the two components to one another in said closed position;
wherein the first and second line retention slots all have essentially the same width sufficient to accommodate duplex insulated line, such that they can each receive and retain insulated duplex line of the same cross-sectional configuration and dimensions, whereby a user of the connector can place each of the first and second lengths of insulated duplex line having the same cross-sectional configuration and dimensions into any of the first and second line retention slots.

2. The connector of claim 1, wherein the connector further comprises a third line retention slot extending bidirectionally from said terminal means, to accommodate a third line extending through said connector with electrical contact with said terminal means.

3. The connector of claim 2, wherein the second and third line retention slots extend through said connector substantially parallel with one another.

4. The connector of claim 2, wherein the third line retention slot has essentially the same width as the first and second line retention slots, such that the first, second and third line retention slots can each receive and retain insulated duplex line of the same cross-sectional configuration and dimensions, whereby a user of the connector can place each of the first and second lengths of insulated duplex line, and optionally a third length of insulated duplex line, all having the same cross-sectional configuration and dimensions, into any of the first, second and third line retention slots.

5. The connector of claim 1, wherein the terminal means includes spikes of electrically conductive material positioned to protrude into each line retention slot to pierce through or otherwise displace insulation material of each line when positioned in each slot, such that each spike makes electrical contact with electrically conductive material of each line running beneath said insulation material.

6. Use of a connector of claim 1, to connect in electrical contact two insulated duplex lines of the same cross-sectional configuration and dimensions thereby to provide electrical contact between a. detonator and another component of a blasting apparatus at a blast site.

7. The use of claim 6, wherein the other component is another detonator.

8. A method for electrically connecting two electrical components at a blast site by means of respective lengths of insulated line, said electrical components comprising at least one electric or electronic detonator, the method comprising the steps of;
(a) providing a connector comprising:
  i. hinge means;
  ii. two components at least one of which comprises terminal means with insulation displacement means, said two components being connected together via the hinge means such that the two components are movable relative to one another between an open position to receive the lengths of insulated line, and a closed position in which the two components engage one another with one component overlying the other component to retain the lengths of insulated line in electrical contact with the terminal means such that the lines are in electrical contact with one another, at least one of the components including line retention slots, wherein the line retention slots comprise:
    a first line retention slot extending unidirectionally from said terminal means for accommodating one of said lengths of insulated line extending to and terminating at the terminal means; and
    a second line retention slot extending bidirectionally from said terminal means and perpendicularly to said first line retention slot for accommodating another of said lengths of insulated line extending bidirectionally through said connector in electrical contact with the terminal means; and
  iii. a releasable catch for reversibly securing the two components to one another in said closed position;
(b) placing one of the lengths of insulated line into one of the line retention slots of the connector in electrical contact with the terminal means;
(c) placing the other of the lengths of insulated line into the other line retention slot of the connector in electrical contact with the terminal means;
(d) moving the two components about the hinge means from said open to said closed position, thereby to retain said two lengths of insulated line in electrical contact with one another;
wherein the lengths of insulated line are lengths of insulated duplex line of the same cross-sectional configuration and dimensions which can each be received in any of the first and second line retention slots.

9. The method of claim 8, wherein the length of insulated duplex line accommodated in the first line retention slot terminates at one end at the terminal means of the connector and is electrically connected to a detonator at its opposite end.

10. The method of claim 8, wherein the length of insulated duplex line accommodated bidirectionally in the second line retention slot is electrically connected to a detonator at one end.

11. The method of claim 8, wherein the length of insulated duplex line accommodated bidirectionally in the second line retention slot is a trunk line.

12. The method of claim 8, wherein the connector further comprises a third line retention slot extending bidirectionally from said terminal means, and said method further comprises accommodating in the third line retention slot insulated duplex line to extend bidirectional through said connector in electrical contact with said terminal means, said insulated duplex line accommodated in the third line retention slot having the same cross-sectional configuration and dimensions as the one and other lengths of insulated duplex line.

13. The method of claim 12, wherein the insulated duplex line that extends through the third line retention slot is said one of the lengths of insulated duplex line that extends from the terminal means through the first line retention slot, thereby to back-up the electrical connection between said length of insulated duplex line and the terminal means.

14. The method of claim 12, wherein the insulated duplex line that extends through the third line retention slot is said other of the lengths of insulated duplex line that extends bidirectionally through the second line retention slot, thereby to back-up the electrical connection between said length of insulated duplex line and the terminal means.

15. The method of claim 12, wherein the insulated duplex line that extends bidirectionally through the third line retention slot is a third length of insulated duplex line having a detonator connected thereto at one end.

16. The method of claim 12, wherein the length of insulated duplex line that extends bidirectionally through the connector in the second line retention slot is a first trunk line, and the insulated duplex line that extends bidirectionally through the connector in the third line retention slot is a second trunk line.

17. The method of claim 12, wherein the second and third line retention slots extend through the connector substantially parallel with one another.

18. The method of claim 8, for establishing electrical connection between detonators located in a single borehole, wherein the connector is a first such connector disposed above the ground, and
(a) the length of insulated duplex line accommodated in the first line retention slot terminates at one end at the terminal means of the first connector and is electrically connected at its opposite end to a first detonator located in the borehole;
(b) the length of insulated duplex line accommodated bidirectionally in the second line retention slot is electrically connected at one end to a further detonator located in the borehole, said length of insulated duplex line comprising a main branch line extending to above the ground;

and wherein the method further comprises providing a second such connector and connecting it to the main branch line with a third length of insulated duplex line extending unidirectionally through the first line retention slot of the second connector and connected at one end to the terminal means of the second connector, said third length of insulated duplex line having a still further detonator located in the borehole connected to its opposite end and having the same cross-sectional configuration and dimensions as the one and other lengths of insulated duplex line, said connection of the second connector to the main branch line being such that the connection is above ground and the main branch line extends bidirecfionally through the second line retention slot of the second connector in electrical contact with the terminal means of the second connector.

19. The method of claim 18, which further comprises attaching the main branch line to a trunk line extending above the ground.

20. The method of claim 18, which further comprises providing a third such connector and connecting it to the main branch line with a fourth length of insulated duplex line extending unidirectionally through the first line retention slot of the third connector and connected at one end to the terminal means of the third connector, said fourth length of insulated duplex line having a still further detonator located in the borehole connected to its opposite end and having the same cross-sectional configuration and dimensions as the one and other lengths of insulated duplex line, said connection of the third connector to the main branch line being such that the connection is above ground and the main branch line extends bidirectionally through the second line retention slot of the third connector in electrical contact with the terminal means of the third connector, and wherein the order of the first, second and third connectors attached to the main branch line corresponds to the order of the respective detonators located in the borehole.

21. A blasting assembly of electrically connected components, the assembly comprising:
(a) an electric or electronic detonator;
(b) a length of insulated line in electrical contact with, and extending from, the detonator;
(c) another length of insulated line in electrical contact with another component of the blasting assembly; and
(d) a connector providing electrical contact between the lengths of insulated line, the connector comprising;
(i) hinge means;
(ii) two components at least one of which comprises terminal means with insulation displacement means, said two components being connected together via the hinge means such that the two components are movable relative to one another between an open position to receive the lengths of insulated line and a closed position in which the two components engage one another with one component overlying the other component to retain the lengths of insulated line in electrical contact with the terminal means, said terminal means providing an electrically conductive bridge such that the lengths of insulated line are in electrical contact with one another, at least one of the components including line retention slots, wherein the line retention slots comprise:

a first line retention slot extending unidirectionally from said terminal means and accommodating a first of said lengths of insulated line extending to and terminating at the terminal means; and
a second line retention slot extending bidirectionally from said terminal means and perpendicularly to said first line retention slot and accommodating a second of said lengths of insulated line extending through said connector in electrical contact with the terminal means; and (iii) a releasable catch for reversibly securing the two components to one another in said closed position;
wherein the lengths of insulated line are lengths of insulated duplex line of the same cross-sectional configuration and dimensions which can each be received in any of the first and second line retention slots.

22. The blasting assembly of claim 21, wherein the length of insulated duplex line accommodated in the first line retention slot terminates at one end at the terminal means of the connector and is electrically connected to a detonator at its opposite end.

23. The blasting assembly of claim 21, wherein the length of insulated duplex line accommodated bidirectionally in the second line retention slot is electrically connected to a detonator at one end.

24. The blasting assembly of claim 21, wherein the length of insulated duplex line accommodated bidirectionally in the second line retention slot is a trunk line.

25. The blasting assembly of claim 21, wherein the connector further comprises a third line retention slot extending bidirectionally from said terminal means in which is accommodated insulated duplex line extending bidirectionally through the connector in electrical contact with the terminal means, said insulated duplex line accommodated in the third line retention slot having the same cross-sectional configuration and dimensions as the one and other lengths of insulated duplex line.

26. The blasting assembly of claim 25, wherein the insulated duplex line that extends through the third line retention slot is said first of the lengths of insulated duplex line that extends from the terminal means through the first line retention slot, thereby to back-up the electrical connection between said length of insulated duplex line and the terminal means.

27. The blasting assembly of claim 25, wherein the insulated duplex line that extends through the third line retention slot is said second of the lengths of insulated duplex line that extends bidirectionally through the second line retention slot, thereby to back-up the electrical connection between said length of insulated duplex line and the terminal means.

28. The blasting assembly of claim 25, wherein the insulated duplex line that extends bidirectionally through the third line retention slot is a third length of insulated duplex line having a detonator connected thereto at one end.

29. The blasting assembly of claim 25, wherein the length of insulated duplex line that extends bidirectionally through the connector in the second line retention slot is a first trunk line, and the insulated duplex line that extends bidirectionally through the connector in the third line retention slot is a second mink line.

30. The blasting assembly of claim 25, wherein the second and third line retention slots extend through the connector substantially parallel with one another.

31. The blasting assembly of claim 25, for establishing electrical connection between detonators located in a single borehole, wherein the connector is a first such connector disposed above the ground, and:

(a) the length of insulated duplex line accommodated in the first line retention slot terminates at one end at the terminal means of the first connector and is electrically connected at its opposite end to a first detonator located in the borehole;

(b) the length of insulated duplex line accommodated bidirectionally in the second line retention slot is electrically connected at one end to a further detonator located in the borehole, said length of insulated duplex line comprising a main branch line extending to above the ground;

and wherein a second such connector is connected to the main branch line with a third length of insulated duplex line extending unidirectionally through the first line retention slot of the second connector and connected at one end to the terminal means of the second connector, said third length of insulated duplex line having a still further detonator located in the borehole connected to its opposite end and having the same cross-sectional configuration and dimensions as the one and other lengths of insulated duplex line, said connection of the second connector to the main branch line being such that the connection is above ground and the main branch line extends bidirectionally through the second line retention slot of the second connector in electrical contact with the terminal means of the second connector.

32. The blasting assembly of claim 31, wherein the main branch line is attached to a trunk line extending above the ground.

33. The blasting assembly of claim 31, further comprising a third such connector connected to the main branch line with a fourth length of insulated duplex line extending unidirectionally through the first line retention slot of the third connector and connected at one end to the terminal means of the third connector, said fourth length of insulated duplex line having a still further detonator located in the borehole connected to its opposite end and having the same cross-sectional configuration and dimensions as the one and other lengths of insulated duplex line, said connection of the third connector to the main branch line being such that the connection is above ground with the main branch line extending bidirectionally through the second line retention slot of the third connector in electrical contact with the terminal means of the third connector, wherein the order of the first, second and third connectors attached to the main branch line corresponds to the order of the respective detonators located in the borehole.

\* \* \* \* \*